United States Patent [19]

Spei et al.

[11] Patent Number: 4,961,858
[45] Date of Patent: Oct. 9, 1990

[54] PROCESS FOR THE DEMULSIFICATION OF OIL/WATER EMULSIONS USING ORGANIC DEMULSIFIERS AND THE USE OF SAID PROCESS

[75] Inventors: Brigitte Spei, Duesseldorf; Volker Wehle, Haan, both of Fed. Rep. of Germany

[73] Assignee: Henkel Kommanditgesellschaft auf Aktien, Duesseldorf, Fed. Rep. of Germany

[21] Appl. No.: 377,972

[22] Filed: Jul. 11, 1989

[30] Foreign Application Priority Data

Jul. 11, 1988 [DE] Fed. Rep. of Germany ....... 3823455

[51] Int. Cl.⁵ ............................................. B01D 17/05
[52] U.S. Cl. ..................... 210/708; 210/709; 210/736; 210/737; 252/341; 252/358
[58] Field of Search ............... 210/708, 735, 709, 727, 210/737, 738, 747, 774, 725, 728, 736; 252/358, 341, 348

[56] References Cited

U.S. PATENT DOCUMENTS

| | | | |
|---|---|---|---|
| 3,755,159 | 8/1973 | Nagy | 210/736 |
| 4,188,293 | 2/1980 | Green et al. | 210/736 |
| 4,387,017 | 6/1983 | McEntire et al. | 210/708 |
| 4,444,654 | 4/1984 | Cargle et al. | 210/708 |
| 4,457,371 | 7/1984 | McCoy et al. | 210/708 |
| 4,576,723 | 3/1986 | Eisenlauer et al. | 210/709 |
| 4,734,205 | 3/1988 | Jacques et al. | 210/727 |
| 4,789,483 | 12/1988 | Spei et al. | 210/708 |
| 4,855,060 | 8/1989 | Durham et al. | 210/708 |

FOREIGN PATENT DOCUMENTS

| | | | |
|---|---|---|---|
| 0038986 | 2/1968 | European Pat. Off. | |
| 2927275 | 5/1962 | Fed. Rep. of Germany | |
| 2507271 | 8/1971 | Fed. Rep. of Germany | |
| 0125040 | 7/1981 | Fed. Rep. of Germany | |
| 3627199 | 8/1986 | Fed. Rep. of Germany | 210/708 |

OTHER PUBLICATIONS

B. Spei and V. Wehle, "Wasser, Luft und Betrieb," Issue 10/86, p. 62 et seq.
B. Spei and V. Wehle, "Wasser, Luft und Betrieb," Issue 5/87, p. 20, et seq.

Primary Examiner—Peter Hruskoci
Assistant Examiner—Krisanne Shideler
Attorney, Agent, or Firm—Ernest G. Szoke; Wayné C. Jaeschke; Real J. Grandmaison

[57] ABSTRACT

A process for demulsifying oil/water emulsions using an organic demulsifier which is added in the optimum amount by means of a controlling device for the metered addition, wherein the demulsification reaction is carried out at a temperature of from 60° C. to 90° C. with mixing.

6 Claims, 2 Drawing Sheets

PROCESS FOR THE DEMULSIFICATION OF OIL/WATER EMULSIONS USING ORGANIC DEMULSIFIERS AND THE USE OF SAID PROCESS

BACKGROUND OF THE INVENTION

1. Field of the Invention

The invention relates to a process for demulsifying oil/water emulsions, e.g. of exhausted cooling lubricant, deep drawing, cutting and/or drilling emulsions by using organic demulsifiers and the use of said process.

In the operations of working and machining metallic materials it is frequently necessary to employ oil-in-water emulsions. These emulsions are used for cooling the workpieces and tools in machining, e.g. in cutting, drilling and turning. In the non-cutting operations of metal working, e.g. in deep-drawing, said emulsions act as lubricants and release agents.

The oil phase of such emulsions predominantly consists of natural or synthetic oils of various chemical composition and origin, while the oil and water phases comprise emulsifiers, wetting agents and other auxiliary materials. The term "emulsions" as employed herein is intended also to include the classic alkaline, neutral, or acidic degreasing and cleansing baths contaminated by an oil content.

Such emulsions are subject to deterioration and exhaustion during use and, thus, have to be continuously or discontinuously disposed of. The most important step in the disposal of such exhausted emulsions is the demulsification thereof. That is, the oil content thereof must be separated as much as possible from the demulsified aqueous phase so that the latter, subsequently to a pertinent after-treatment, may be discharged into a sewage system or drainage ditch without giving rise to ecological problems.

DISCUSSION OF RELATED ART

The demulsification by means of organic demulsifiers and the measurement of the optimum dosage final product is described in German Patent Application No. P 36 27 199.3 "Verfahren zur Steuerung der Spaltung von öl-/Wasseremulsionen" equivalent to U.S. Patent No. 4,789,483 issued on Dec. 6, 1988 ["Process for controlling the demulsification of oil/water emulsions"]. Furthermore, this demulsification process by Assignee and its advantages over classic demulsification processes are described in greater detail by B. Spei and V. Wehle "Wasser, Luft und Betrieb", Issue 10/86, pp. 62 et seq. and loc. cit., Issue 5/87, pp. 20 et seq..

Upon said demulsification there is obtained, in addition to the demulsified aqueous phase, the used oil phase which contains foreign matter such as water and abraded metal originating from the working operations. By the use of the classic demulsification processes such as demulsification by means of a salt, of an acid, of a hydroxide or by means of adsorbents, the used oil phase contains foreign materials in the form of hydroxides or adsorbents additionally introduced by the demulsifying procedure. In demulsification by membrane processes, e.g. by ultrafiltration, there are obtained residues which contain 50% water in the best case, and usually >50% of water.

Used oils recovered from demulsification units are subject to legal restrictions on waste materials, i.e. the disposal thereof involves considerable costs. The efforts of the managers of demulsification plants are directed to minimize the costs for the disposal as much as possible, i.e. to reduce the volume of the used oil to be disposed. Thus, the used oil phase as far as possible should be free from materials introduced by the demulsification process such as, e.g., hydroxides or generally foreign materials, and should contain as little water as possible.

The use of organic demulsifier products ensures that no solids derived from said products will be introduced into the oil phase and that no increase in volume of the used oil amounts to be disposed of will occur due to the demulsification process. Moreover, the used oils produced by the use of organic demulsifiers are lower in water content than are the residues obtained from ultrafiltration devices. As a rule the water contents are within the range of from 20 to 40%.

Further, the used oils produced by demulsification with organic demulsifiers can be significantly better dehydrated than the residues and used oils from conventional demulsification processes.

Nevertheless, the dehydration of used oils from demulsification with organic products also requires considerable technical and economical expense. At best, after withdrawal of the used oil from the water phase the dehydration is carried out merely statically in a separate tank at room temperature. However, it occurs substantially more frequently that additional dehydrating products, temperatures of from 60° C. to 90° C. and mechanical aids such as centrifuges or decanters must be employed.

The problems inherent to heating such used oils with respect to heat exchanger materials, deposition and cleaning and disposal of vent air have not yet found adequate technical solutions.

In the classic processes, an increase in temperature is not capable of attaining any improvement in the quality of the used oil; that is, a used oil containing a lesser amount of water cannot be obtained. This is shown hereinbelow in a Comparative Example.

The presence of solid materials and foreign matter in the used oil phase gives rise to additional problems occuring in the area of the mechanical dehydration aids, e.g. separator and/or decanter wear, insufficient separation of oil, solid and water phases.

DESCRIPTION OF THE INVENTION

Other than in the operating examples, or where otherwise indicated, all numbers expressing quantities of ingredients or reaction conditions used herein are to be understood as modified in all instances by the term "about."

It is an object of the present invention to provide a process for demulsifying oil/water emulsions using organic demulsifiers which are added in the optimum amount by means of a controlling device for the metered addition, said process being technically less expensive, capable of being carried out at lower cost and, moreover, operable at a lower production rate of waste materials to be disposed than the classic demulsification processes known from the prior art.

Said object is attained by the specific selection of a definite temperature interval.

Accordingly, the present invention relates to a process for demulsifying oil/water emulsions using organic demulsifiers which are added in the optimum amount by means of a controlling device for the metered addition, the process being characterized in that the demulsification reaction is carried out at a temperature of from 60° C. to 90° C. with mixing.

Although an efficient demulsification of the oil/water emulsion is technically feasible within the entire temperature range according to the invention, for reason of costs, it is preferred to carry out the demulsification reaction in the lower range of said temperature interval, so that a temperature range of from 60° C. to 80° C. is preferred.

When the process according to this invention is employed, it is no longer necessary to subject the used oil product to an after-treatment by means of physical separation procedures. There is obtained a used oil which contains only a small amount of water, so that the process according to the invention altogether offers economical and technical advantages and the used oil obtained thereby as one of the process products has a water content of less than 10% by weight, and preferably of less than 5% by weight, based on the weight of the used oil.

In addition, the invention also relates to the use of the process according to the invention for the demulsification of oil/water emulsions, e.g. of exhausted emulsions after their use as cooling lubricants, deep drawing, cutting and/or drilling emulsions.

Figure 1:
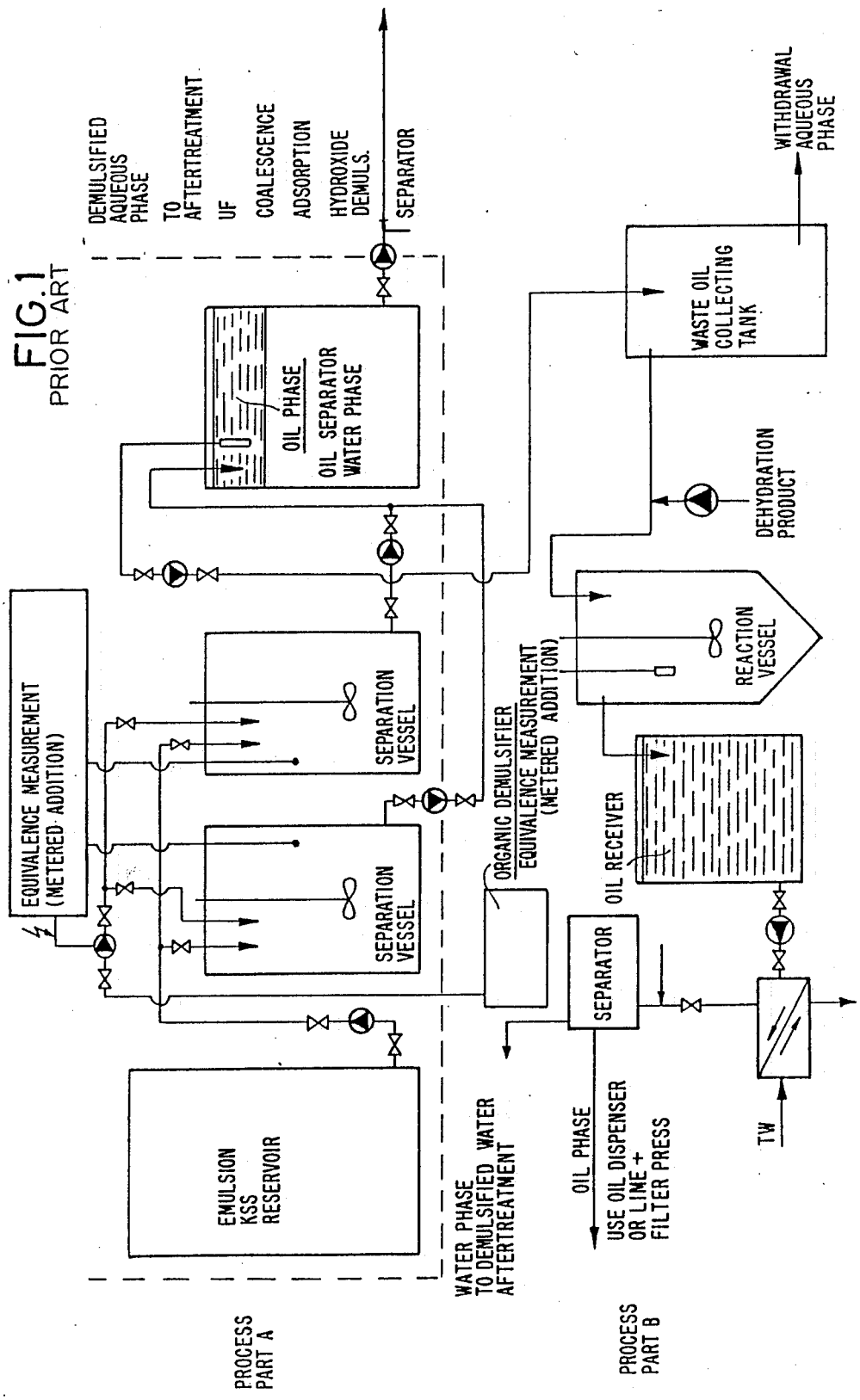
FIG. 1 illustrates the course of a demulsification process with organic demulsifier products in consideration of the determination of the end point of the metered addition and subsequent dehydration of used oil according to the prior art.
Figure 2:
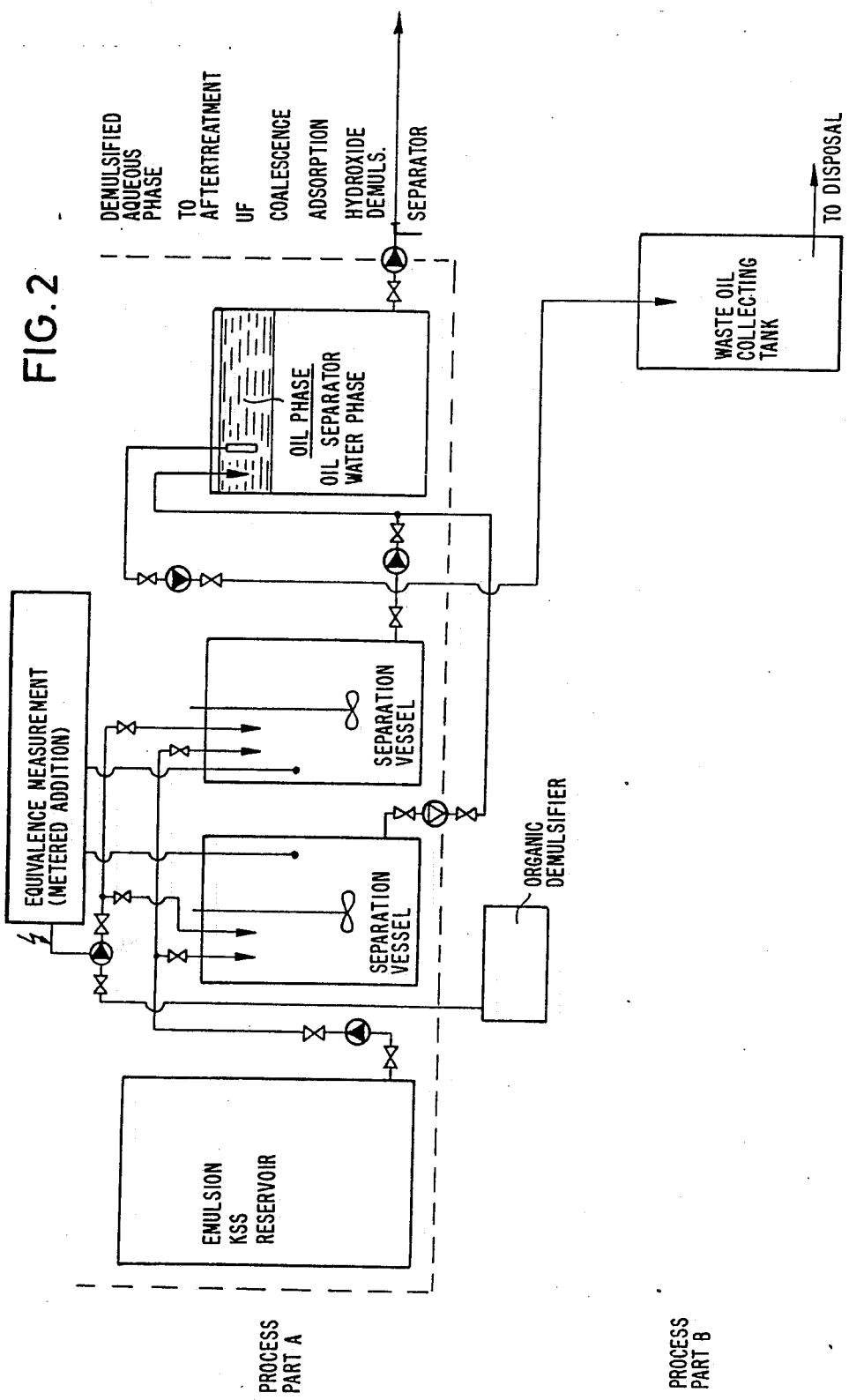

In the preferred mode of operation of the demulsification at from 60° C. to 80° C. as shown by FIG. 2, the process step B of the prior art is dispensable.

The invention is further illustrated by the following examples.

The criteria for the evaluation of the obtained results were the metered amount of added demulsifier, the proportion by volume of the used oil supernatant liquid, the residual oil content in the demulsified aqueous phase and the water content of the used oil.

The required amounts for the metered addition were determined by means of a P3-ferromat ® 8960 (determination of the end point of the metered addition in accordance with German Patent Application No. P 36 27 199.3 or U.S. Pat. No. 4,789,483), a processor developed by Assignee for the automatic demulsification and a controller for the demulsifier metering pump. The supernatant liquid proportion was measured in % by volume, relative to the total sample volume.

The petroleum ether extractables (PE) contained in the demulsified aqueous phase were determined according to DIN 38409 H17/H18. The water content of the supernatant liquid was determined by heating 2 g of the supernatant liquid for 20 min. in the microwave oven, for example the apparatus Bauknecht MWO, stage 10.

Experimental Setup:

5 To a 2-liter beaker was added 1 liter of the emulsion to be demulsified. The stirrer was turned on via the P3-ferromat ® 8960 and after a stirring period of 30 seconds, the P3-ferromat unit turned on the demulsifier metering pump. The endpoint of the demulsification was monitored by means of the turbidimetric probe installed in the beaker. Once the endpoint of the metered addition had been reached, the P3-ferromat ® 8960 switched off the metering pump and the stirrer. After predetermined holding periods in accordance with the conditions in practice, the supernatant liquid proportion, the PE in the demulsified aqueous phase and the water content in the supernatant liquid were determined.

The tests were run at least at 20° C., 60° C. and 80° C. In each case, heating was effected prior to the metered addition of the demulsifier.

EXAMPLE 1

An exhausted mineral oil-containing, watermiscible, coolant-lubricant emulsion for machining steel was demulsified according to the setup described above. As the demulsifier there was used a polyamine having the general formula

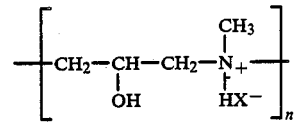

and having an average molecular weight of $0.1 \times 10^6$ in the amounts as described hereinbelow.

The experimental parameters were the following: pH value of the untreated emulsion: 9.1 PE portion of the untreated emulsion: 53,000 mg/l.

The results obtained after demulsification at the original pH value are set forth in the following Table:

| Temp. (°C.) | Added metered demulsifier product (% by vol.) | Amount of supernatant liquid after 30 min. (% by vol.) | PE of demulsified aqueous phase (mg/l)* | H$_2$O Content of supernatant liquid (%) after 30 min. |
|---|---|---|---|---|
| 20 | 1.1 | 18 | 280 | 40.8 |
| 60 | 0.8 | 10 | 200 | 32.9 |
| 70 | 0.7 | 10 | 200 | 15.2 |
| 75 | 0.5 | 10 | 175 | 9.8 |
| 80 | 0.5 | 10 | 160 | 4.0 |

*after 1 hour of holding time

This emulsion, due to demulsification at an elevated temperature (from 60° C. to 80° C.), is capable of effecting a distinct saving in demulsifier as well as producing a supernatant liquid having a reduced H20 content.

EXAMPLE 2

Example 1 was repeated, however with the modification that the holding period was extended to 3 hours. The results are summarized in the following Table:

| Temp. (°C.) | Added metered demulsifier product (% by vol.) | Amount of supernatant liquid after 3 hrs. (% by vol.) | PE of demulsified aqueous phase (mg/l)* | H$_2$O Content of supernatant liquid % after a holding time of 3 hours |
|---|---|---|---|---|
| 20 | 1.1 | 15 | 200 | 39.0 |
| 60 | 0.8 | 8 | 140 | 14.2 |
| 80 | 0.5 | 8 | 60 | 4.0 |

*after 3 hours of holding time

EXAMPLE 3

An exhausted mineral oil-containing water-miscible coolant-lubricant emulsion from a collection tank of an automotive factory was demulsified according to the setup described above. As a suitable demulsifier there was used a polyamine having the general formula

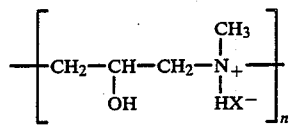

and having an average molecular weight of $0.15 \times 10^6$

The untreated emulsion exhibited the following values:

| pH value: | 8.1 |
|---|---|
| PE: | 20,000 mg/l. |

The results obtained after demulsification at the original pH value are set forth in the following Table:

| Temp. (°C.) | Added metered demulsifier product (% by vol.) | Amount of liquid after 60 min. (% by vol.) | PE of aqueous phase (mg/l)* | H₂O Content of supernatant liquid time of 1 hr. | 3 hrs. |
|---|---|---|---|---|---|
| 20 | 0.65 | 10 | 90 | 22.0 | 20.8 |
| 60 | 0.65 | 10 | n.d** | 12.9 | 9.6 |
| 80 | 0.65 | 10 | n.d. | | 4.5 |

*after 1 hour of holding time
**not detectable

In this emulsion, the amount of demulsifier required remains unchanged upon elevation of the temperature; however, again a water content of <5% by weight is reached in the used oil.

COMPARATIVE EXAMPLE (CONVENTIONAL DEMULSIFICATION PROCESS)

The emulsion of Example 3 was demulsified under conventional conditions of practice by acidification with $H_2SO_4$ to pH 2, addition of $FeCl_3.6\ H_2O$ and re-neutralization with $Ca(OH)_2$ to pH 8, and the used oil supernatant liquids were separated off by means of relaxative flotation. A dehydration of the supernatant liquid was not possible at all at room temperature, and even at 90° C. it had not yet been successfully accomplished by using a three-phase decanter. The total amount of used oil must be disposed of at high costs.

What is claimed is:

1. A process for demulsifying an oil-in-water emulsion comprising adding an organic polyamine demulsifier to said emulsion in a separation vessel by means of a metering device for the controlled addition of said demulsifier, and conducting the demulsifying process at a temperature of from about 60° C. to about 90° C. while mixing the emulsion and demulsifier to provide a demulsified product having a water content of less than about 10% by weight based on the weight of said emulsion, said polyamine demulsifier having the formula

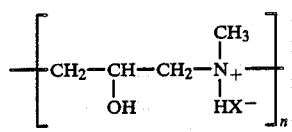

and an average molecular weight of about $0.1 \times 10^6$ wherein the addition of demulsifier is controlled by a turbidimetric probe in said separation vessel.

2. A process as in claim 1 wherein said demulsifying process is conducted at a temperature of from about 60° C. to about 80° C. while mixing the emulsion and demulsifier.

3. A process as in claim 1 wherein said oil-in-water emulsion comprises a used cooling lubricant.

4. A process as in claim 1 wherein said oil-in-water emulsion comprises a used deep drawing oil emulsion.

5. A process as in claim 1 wherein said oil-in-water emulsion comprises a used cutting or drilling emulsion.

6. A process as in claim 1 wherein said polyamine has an average molecular weight of about $0.15 \times 10^6$.

* * * * *